United States Patent [19]
Venkatakrishnan

[11] Patent Number: 5,768,350
[45] Date of Patent: Jun. 16, 1998

[54] REAL-TIME AND NON-REAL-TIME DATA MULTPLEXING OVER TELEPHONE LINES

[75] Inventor: Ganesan Venkatakrishnan, Fremont, Calif.

[73] Assignee: Phylon Communications, Inc., Fremont, Calif.

[21] Appl. No.: 309,327

[22] Filed: Sep. 19, 1994

[51] Int. Cl.$^6$ .................................................. H04M 11/00
[52] U.S. Cl. .................................. 379/93.08; 379/93.09; 370/418
[58] Field of Search .................. 348/17, 18, 14, 348/13; 379/98, 96, 93, 93.01, 93.05, 93.08, 93.09, 93.17, 93.26, 93.28, 93.31; 375/222; 370/418

[56] References Cited

U.S. PATENT DOCUMENTS

| | | | |
|---|---|---|---|
| 5,231,492 | 7/1993 | Dangi et al. | 348/17 |
| 5,303,237 | 4/1994 | Bergman et al. | 370/418 |
| 5,359,644 | 10/1994 | Taraka et al. | 348/17 |
| 5,428,608 | 6/1995 | Freeman et al. | 375/222 |
| 5,453,986 | 9/1995 | Davis et al. . | |
| 5,463,616 | 10/1995 | Kruse et al. | 379/93 |
| 5,502,727 | 3/1996 | Catanzaro et al. | 379/93 |

OTHER PUBLICATIONS

"DataPort 2001—Mutimedia Communicator with VoiceSpan", AT&T Paradyne BBS. 3730-A2-GZ41-00. Issue 1. Oct. 1993. pp. 1-14.
"VoiceView: A New Protocol for Integrated Voice & Data Applications", AT&T Radish. Protocol 294. pp. 1-11.

*Primary Examiner*—Stella Woo
*Attorney, Agent, or Firm*—Philip H. Albert; Townsend and Townsend and Crew

[57] ABSTRACT

An improved communication system which allows data, voice, and/or other non-real-time and real-time data streams to be transferred from one station to another over a single telephone line with optimal use of the available bandwidth and with a transparency to data transferring processes such as in computer systems coupled to the station interface devices is disclosed. A local data+voice interface device accepts digital data at a data port, analog voice signals at a voice port, digitizes the voice signals, compresses them, packetizes both the digital data and the digital voice data, identifying for each packet the type of data contained therein, and transmits the packets to a remote data+voice interface device, which separates the packets by their identification, and reconstructs the separate voice and data streams.

7 Claims, 6 Drawing Sheets

| Start Flag | Address | Control | Data | FCS | End Flag |
|---|---|---|---|---|---|

Fig. 5

| Start Flag | Voice Packets | Abort Flag | n-byte data packet | Voice Packets | End Flag |
|---|---|---|---|---|---|

Fig. 6

Prior Art

Fig. 7

REAL-TIME AND NON-REAL-TIME DATA MULTIPLEXING OVER TELEPHONE LINES

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of communications, and more specifically, to the need to communicate multiple forms of real-time and non-real-time information over telephone lines.

The term "information", as used herein, includes, but is not limited to, analog signals and digital data. Analog signals convey information which is generally presented in analog form, although analog signals might be converted to digital data streams and back. It is well known to convert voice signals to digital data streams, with optional compression, and to transmit of the digital data streams over a digital channel. Herein, the terms "data" and "information" are used interchangeably.

The goal of a communications system is to transfer data between two stations, either in one direction or both directions or one direction at a time. A "station" can be a telephone, computer, or combination thereof and may or may not involved a person at the situation to receive signals, such as the sound of a speaker's voice. Herein, the concern is the transfer of data between two stations connected by a telephone line. If the two stations are differentiated, one is labelled the "local" station and the other is the "remote" station. Because of the nature of telephone lines, the actual transfer is performed by sending analog electrical signals within a frequency range, or bandwidth, of the telephone line, however, digital telephone lines are also possible.

The most common arrangement where the need arises for voice and data over a single telephone line is where two people desire to carry on a conversation and transfer computer files, facsimile images, etc., between the two people, where only one telephone line is available. From one person's perspective, they are at a local site, and the other person is at a remote site, although they are symmetric. Voice signals are typically sent using a handset, headset, telephone instrument or speakerphone at each end of the telephone line (local and remote), while data is typically sent from a computer at the local end through a modem at the local end, the telephone line, and a remote modem, respectively, to reach a computer at the remote site. The data might be video phone display data, interactive video game data, or MIDI data, etc.

The term "real-time", as used herein, refers to data which has a time element in its presentation and transfer. For example, if a speaker speaks for one second the local station generates corresponding voice samples, the voice samples should be received at the remote station and output to a listener starting shortly after the start of the speech (i.e., with low delay), and the voice samples should be received evenly over a period of roughly one second. If the voice samples did not arrive within one second, the speaker and listener will have difficulty carrying on a two-way conversation.

By contrast, non-real time data, such as a still image, can be received over any period without ill effects, so long as the image is received when it is needed. In most applications, the time when an image is needed varies much more than the time needed to transmit the image, so that, timing of the data's transmission is not very critical. For example, a facsimile image can be transmitted in 60 seconds. Suppose the speaker at the local station wishes to discuss the image with the listener at the remote station. In this case, a delay of one or two minutes is acceptable if the facsimile is sent before the conversation requires it, and the transmission need not be received evenly over the few seconds.

In some applications, real-time data can be treated as non-real-time data, for example if voice data or video data is to be received and merely recorded the voice data can be sent in bursts, and faster or slower than its real-time "playing" time. One such example is a telephone answering machine where a message could be sent and recorded at any speed, so long as the playback was in real-time.

It is well known to use modems to transmit digital data from one computer system to another via a telephone line with two modems, each coupling one of the computer systems to the telephone line. It is also well known to use a telephone at each end of the telephone line to transmit voice between the ends of the telephone lines. The increasing use of modems has brought about another problem, i.e., how to transmit data over the phone line while still using the telephone line for voice.

Several schemes have been proposed for interleaved voice and data transmission, but all so far have had serious disadvantages. Today, data rates of 14,400 bits per second are expected, yet the typical public switched telephone network (PSTN) line only has a bandwidth of 3000 Hertz. Thus, the limited bandwidth of the telephone line must be used efficiently. Also, any interleaved or multiplexed voice and data should be transparent to existing computers and computer programs, because they might otherwise require expensive modifications to a computer system and its software to handle voice/data switching.

Figure 1:
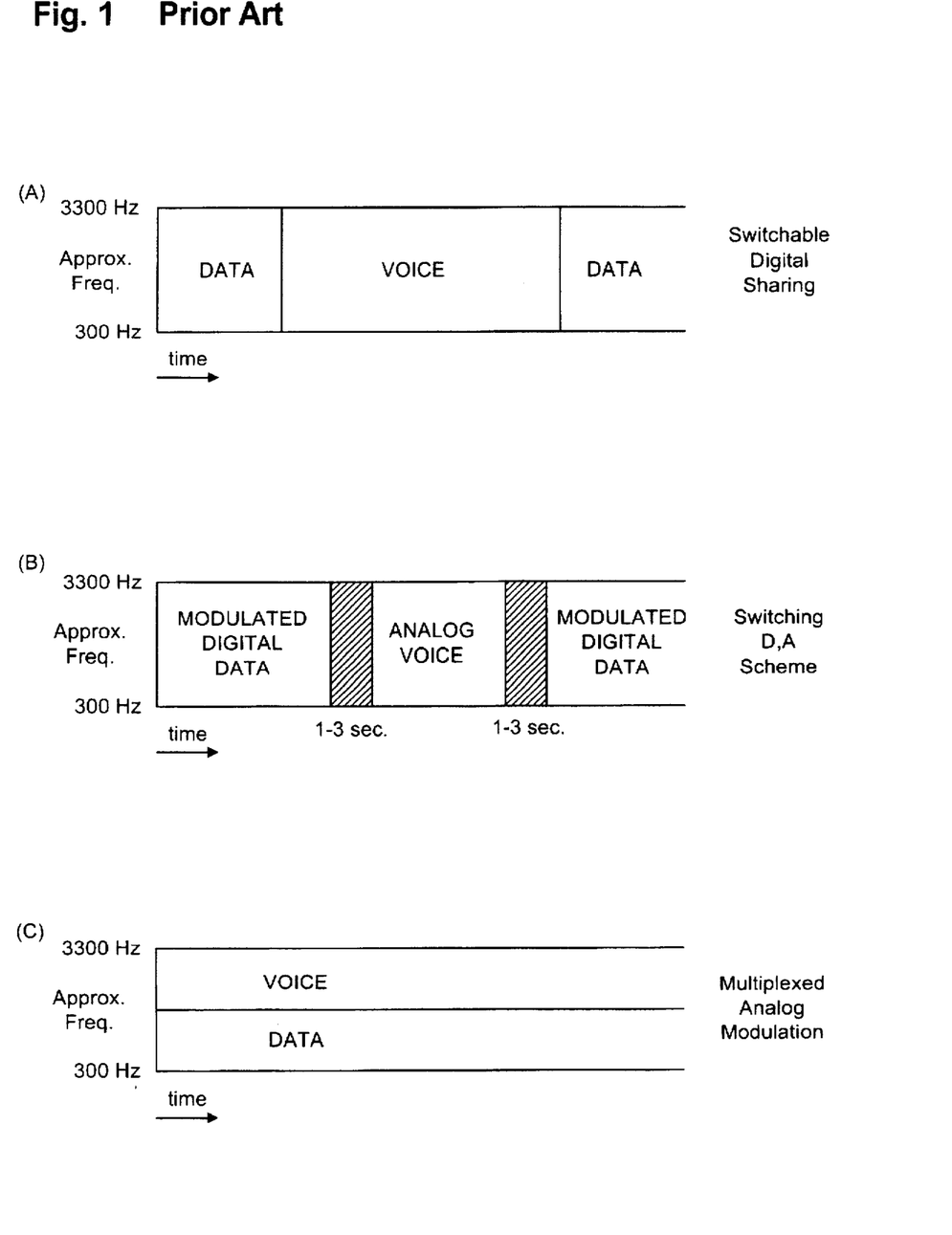
FIGS. 1(a)–(c) are channel allocation diagrams for three prior art channel allocations for voice and data over a single telephone channel.

One known scheme for sending voice and data is switchable sharing, depicted in FIG. 1(a), wherein a modem transmits both voice and data over a single telephone line, switching between voice and data when the modem receives a control command from the computer system. When the modem is in an "off-hook" state, data is transmitted and no voice is transmitted. When the modem is in an "on-hook" state, voice is transmitted and no data is transmitted. The difficulty with this type of modem is that the state transitions must be specified manually, requiring the computer system to be programmed to handle the state transition commands. The transition is typically initiated by a user, so not only must the computer be reprogrammed, a user must know when to switch. Consequently, a modem of this design is not usable in an application where the programs of the computer system are not accessible.

Another method of transmitting voice and data over a single telephone line is the method used by AT&T's DataPort 2001 Multimedia Communicator, which involves splitting the available bandwidth into two virtual channels, one for voice and one for data. This is depicted in FIG. 1(b). This method is an inefficient use of bandwidth unless both channels are filled to capacity. For example, if no voice is being transmitted, the voice bandwidth is simply not used, and likewise for the data channel. The typical division of the total bandwidth must be selected in advance from a data-only mode, with a 14.4 Kbps ("kilobits per second") data rate and no voice, to a 4.8 Kbps data rate mode with a voice channel.

Yet another known method is the method used by the Voiceview (tm) technology promoted by Radish Communications, Inc., which is depicted in FIG. 1(c). With Voiceview, the full bandwidth is available for data or voice, but not both. The data is sent digitally and the voice is sent analog. This method requires a one- to three-second switching time between analog voice transmissions and digital data transmissions. This method has several disadvantages, in that voice cannot be sent during data communication (there will be some dead time while data is being transmitted), the remote site needs to be informed each time a switch will be occurring, and the computer systems which interface to a modem with Voiceview require modifications to deal with the voice-to-data and data-to-voice switching.

SUMMARY OF THE INVENTION

An improved communication system is provided by virtue of the present invention, which allows data, voice, and/or other non-real-time and real-time data streams to be transferred from one location to another of like design over a single telephone line with optimal use of the available bandwidth and with a transparency to data transferring processes in computer systems coupled to the modems in existing applications.

In one embodiment of the present invention, a local D+V modem accepts digital data at a data port, analog voice signals at a voice port, digitizes the voice signals, compresses them, packages both the digital data and the digital voice data into frames, identifying for each frame with an address according to the type of data contained therein, and transmits the frames to a remote D+V modem. The remote D+V modem separates the frames by their address, and reconstructs the separate voice and data streams.

More generally, the data stream can be one digital data stream or multiple types of data streams multiplexed together, which need not arrive at the remote modem as a "paced" data stream (i.e., non-real-time data). Also, the real-time data need not be voice data, but can be video, audio, MIDI ("Musical Instrument Digital Interface") or other data which is expected to stream at a particular rate. Because the real-time data stream and the non-real-time data stream are frame interleaved, the real-time data can be given priority so it arrives at the remote modem in a timely manner, with the non-real-time data transmitted when no real-time data is waiting to be transmitted. Thus, if the real-time data is voice, no voice frames need be sent in moments of silence, so the non-real-time data frames can be inserted in the silent pauses normally found in speech, as well as the extra gaps provided by speech compression.

In an alternate embodiment, voice and video game control data are sent over a single telephone line. In this embodiment, the video game data comprises two unidirectional data streams which allow two game players to play a video game which responds to inputs from both players. Video game data is interspersed in digitized voice data frames, so that the video game data is transferred with very low delay.

Although it is well known to convert voice to digital data, the present invention includes a novel method of compressing voice signals into digital data to more efficiently use a digital channel such as the channel between two modems. An example is ADPCM, which is a variant of the G.726 standard.

One advantage to the present invention is full use of the available bandwidth, with dynamic allocation to different data streams as needed, with real-time data arriving in real time with reasonable amounts of buffering of 100-300 ms.

Another advantage is that voice data, if received in error, can be silenced or the previous frame replayed at the remote modem, rather than exposing a listener to erroneous data. This is done by dropping packets identified as voice packets which contain unrecoverable errors or replaying the previous non-erred voice packet.

Herein, the term "modem" refers to conventional analog modems as well as ISDN serial interface devices which link to ISDN lines. Strictly speaking, an ISDN device is not a modem, since "modem" is short for modulator/demodulator used with analog lines, however "modem" has taken on a general meaning of a device which couples a computer communication line to a telephone line.

A further understanding of the nature and advantages of the inventions herein may be realized by reference to the remaining portions of the specification and the attached drawings.

DESCRIPTION OF THE PREFERRED EMBODIMENTS

Figure 2:
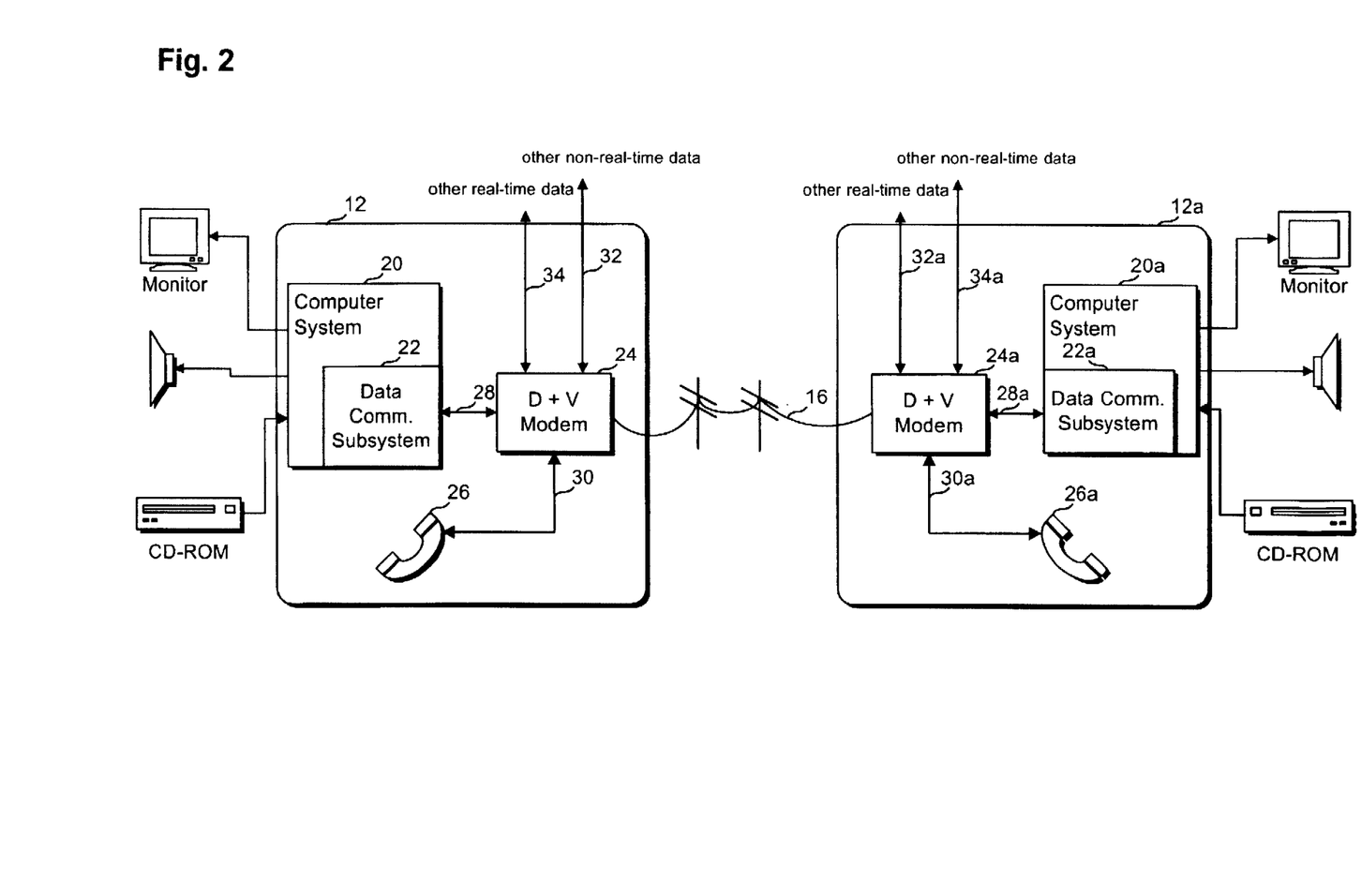
FIG. 2 is a high-level block diagram of a communication system which allows voice signals and data to be communicated between two stations.

FIG. 2 shows a communication system 10 according to the present invention. Communication system 10 allows for the transfer of data from one site 12 to another site 12a through a public switched telephone line 16. Site 12, which is essentially similar to site 12a, is shown with a computer system 20, a data communication subsystem 22, a D+V (data+voice) modem 24 and a telephone handset 26. D+V modem 24 is coupled to subsystem 22 via a communications cable 28, and to handset 26 via a twisted pair 30. D+V modem 24 is also connected to line 16. Station 12a includes a computer system 20a, a data communications subsystem 22a, a D+V modem 24a, and a handset 26a.

It should be apparent that other variations are possible. For example, D+V modem 24 can be integral to subsystem 22 and/or system 20, as would be the case if system 20 is a lap-top computer and D+V modem 24 is an internal telephone/modem. Also, handset 26 need not be as depicted, but could be a headset or other microphone and/or earphone combination. For other applications, handset 26 is interchangeable with other devices which communicate real-time data. If D+V modem 24 is internal to subsystem 22, then cable 28 might be replaced by an internal bus with similar functionality.

In operation, computer system 20 transfers data between itself and system 20a over line 16, while voice communication occurs between handset 26 and handset 26a, all using only line 16. In many applications, computer systems 20, 20a and subsystems 22, 22a cannot be easily modified. With the D+V modem, such systems do not need to be modified, because the interface over cable 28 is transparent to voice traffic. This is possible since most modern communications subsystems are configured for handshaking with a modem which allows a modem to slow down the passage of data from the communications subsystem to the modem when the modem has difficulty keeping up. The effect of voice transmission on data transmission at cable 28 is only to create an apparent slowdown in the D+V modem's data transmission rate, and only when voice data is being transferred. Of course, in some embodiments, D+V modem 24 accepts configuration commands over cable 28 which are not found in a standard data communications interface.

As shown in FIG. 2, D+V modem 24 also accepts other data sources, which carry either non-real-time data 32 or real-time data 34. Each of these sources of data is multiplexed onto line 16 as explained below in connection with FIG. 4.

Figure 3:
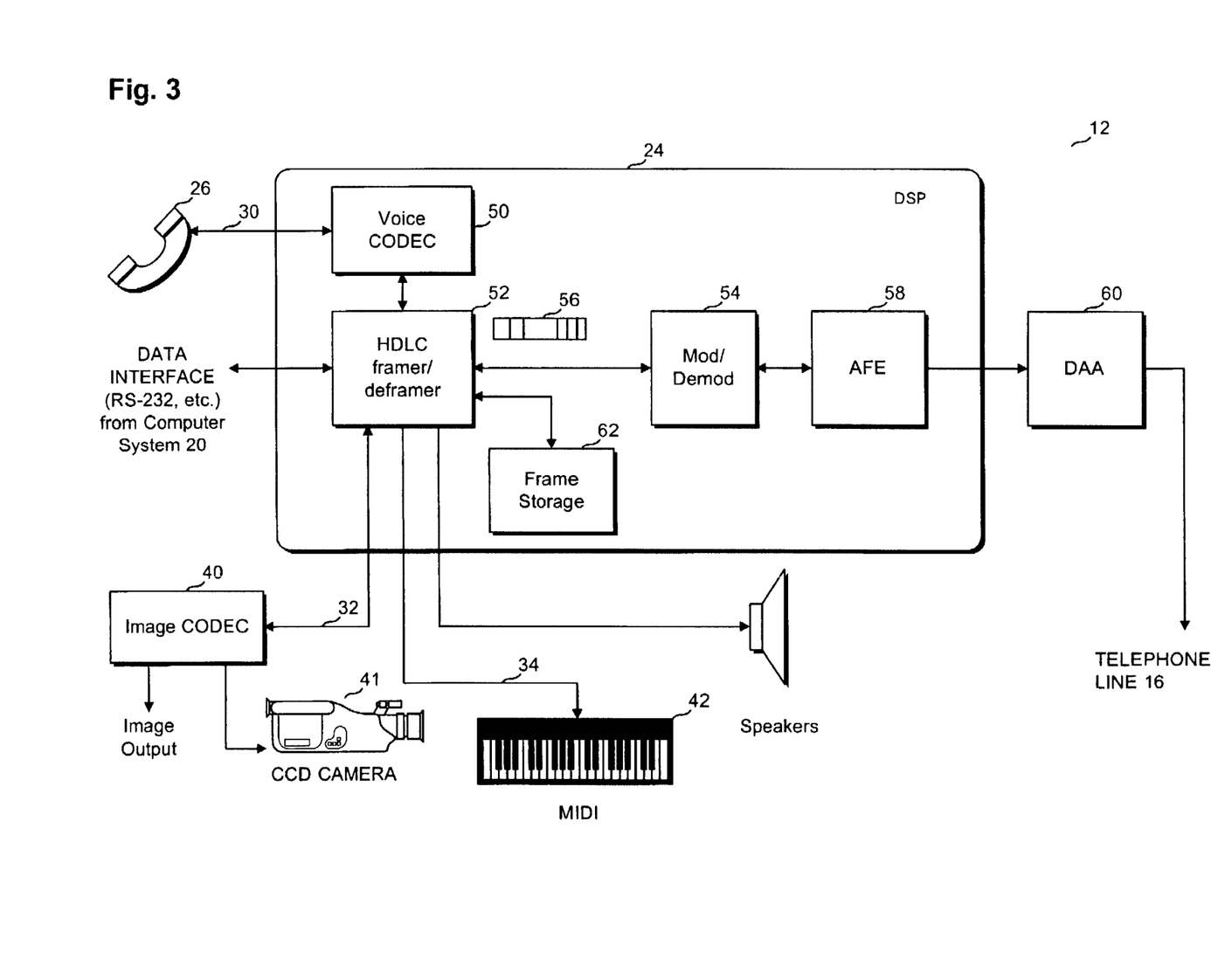
FIG. 3 is a more detailed block diagram of one station in the communication system of FIG. 2.

FIG. 3 is a more detailed block diagram of one site, 12, of communication system 10. Site 12 is shown with D+V modem 24 in greater detail, an image CODEC (analog coder/decoder) 40 and a CCD camera 41 as a typical source and destination of non-real-time data, and a MIDI instrument 42 as a typical source and destination of real-time data. D+V modem 24 is shown including a voice CODEC 50 which codes/decodes voice signals including compression/ decompression, an HDLC (High-level Data Link Control) framer/deframer 52 (HDLC controller, for short), which communicates with a modem module 54 using HDLC frames such as frame 56, and an analog front end (AFE) 58, which is coupled to modem module 54. An output of AFE 58 is coupled to a data access arrangement (DAA) 60, which is in turn coupled to line 16. Frame storage 62 is also provided for buffering frames where data is framed faster than the capacity of telephone line 16.

Except where noted otherwise, HDLC controller 52 operates per the HDLC protocol as defined in the ISO document numbered ISO-3309, "Data Communication—High-Level Data Link Control Procedure—Frame Structure".

Voice CODEC 50 is coupled to handset 26 via twisted pair 30, and is also coupled to HDLC controller 52 to provide digitized compressed voice data to HDLC controller 52. A data port of HDLC controller 52 is coupled to subsystem 22 (see FIG. 2) to receive data from computer system 20. This coupling, in one embodiment, is a standard RS-232 connection, while in another embodiment, it is a parallel data bus. HDLC controller 52 is also shown coupled to image CODEC 40 and MIDI instrument 42 using those devices' standard interfaces. In a video game application, voice might be obtained from a pilot headset/microphone or a speakerphone.

HDLC controller 52 frames each of the data streams input thereto into frames, while multiplexing the frames at its output to modem module 54. HDLC controller 52 also de-packetizes received frames and directs them to the proper outputs. Because frames are only sent when data is presented to HDLC controller 52, the channel bandwidth provided by line 16 is used efficiently. Because HDLC controller 52 gives frames for real-time data priority over frames for non-real-time data, the real-time data is received in realtime, with the non-real-time data filling the gaps in the real-time data streams. Of course, if the real-time data does not fit into the channel bandwidth, such as uncompressed, full-motion video, it cannot be sent in real time. HDLC controller 52 is also capable of separating (de-multiplexing) frames received from a remote site through the use of a frame address at the link layer, as shown in FIG. 4.

Figure 4:
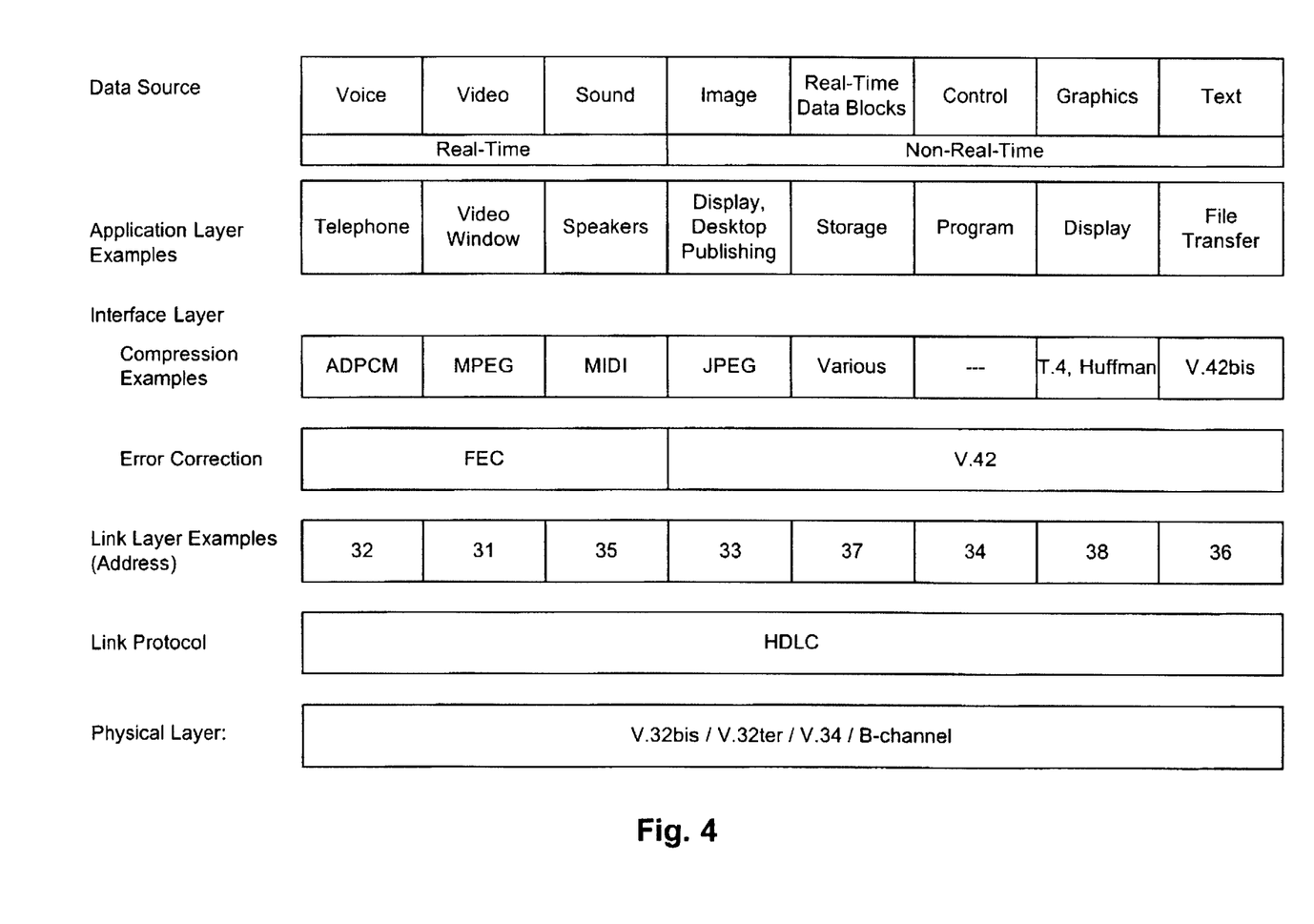
FIG. 4 is a chart showing examples of the data transmittable over the D+V communications system and the protocols used at several network levels for these types of data.

FIG. 4 is a chart showing several sources of data which are transferrable over a telephone line. For each of the data types, an exemplary application is shown, although other applications are possible. As indicated, all the various data types use the HDLC protocol at the link network layer (of the standardized seven layer network model).

As FIG. 4 illustrates, different error correcting schemes are used for real-time data and non-real-time data. Real-time data may be error-corrected using forward error correction (FEC), while non-real-time data may be corrected using the V.42 standard's protocols, wherein a block received in error results in the receiving modem requesting re-transmission. Although voice uses FEC, some voice frames might have too many errors and thus not be recoverable. If the error is not recoverable, then the receiving modem replaces the signal which would have resulted from the frame with silence or the previous voice frame to avoid crackling and pops due to noise. The V.42 standard is defined in CCITT Recommendation V.42, "Error Correcting Procedures for DCEs Using Asynchronous to Synchronous Conversion".

Figure 5:
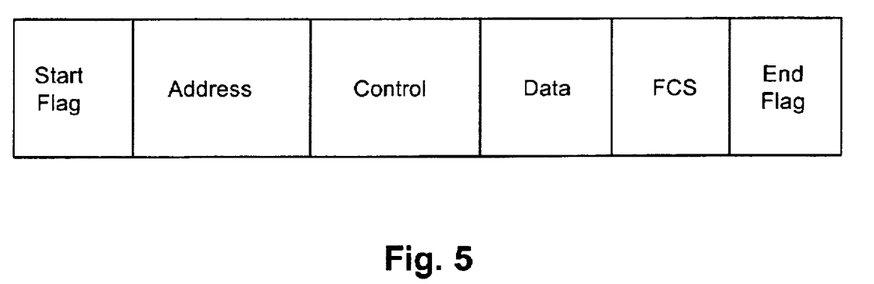
FIG. 5 is a schematic diagram of an HDLC (High-level Data Link Control) frame, as used with the present invention.

FIG. 5 is a schematic diagram of an HDLC frame, as used with the present invention. An HDLC frame comprises the fields shown in Table 1. The addresses that may be assigned in a typical implementation for several data stream types are shown in Table 2, below. As should be apparent, other assignments of values for data stream addresses are possible so long as the sender and the receiver of a data stream agree on the meaning of the addresses.

TABLE 1

Fields of an HDLC frame.

| Field | Contents |
| --- | --- |
| Start Flag | 01111110 |
| Address | Identifies the data stream type (see Table 2). |
| Control | The V.42 specification specifies the use of this field for data. For voice, this field is optional. |
| Data | A portion of the data stream which has been framed |
| FCS | Frame CheckSum (calculated per the HDLC standard) |
| End Flag | 01111110 (Could be combined with Start Flag of next frame) |

TABLE 2

| Data Stream Type | Address |
| --- | --- |
| Voice | 32 |
| Video | 31 |
| Sound | 35 |
| Image | 33 |
| Data Blocks | 37 |
| Control | 34 |
| Graphics | 38 |
| Text | 36 |

The Control field contains one or two bytes, per the V.42 specification. The FCS field is calculated by performing a check sum on the address, control and data fields.

Since each HDLC frame contains an address indicating its data stream type, and each frame contains only data from one type of data stream, HDLC controller 52 can easily separate received frames for each data stream multiplexed onto line 16. And since frames for the various data types can be freely intermixed, the full bandwidth of the channel is dynamically allocated to the various data streams.

If data from all data streams is presented to HDLC controller 52 faster than the channel can carry the data, some of the data is framed and bufferred into frame storage 62. Alternately, where provided, HDLC controller 52 will send control signals back to the source of a non-real-time data stream to indicate that modem 24 is temporarily busy (e.g., sending an XOFF byte or a CTS off signal back to subsystem 22 over an RS-232 line which uses software handshaking to hold up data at the sending end). When real-time data arrives fast enough to occupy the entire channel, the non-real-time data streams are held up or bufferred, so that the real-time data arrives at the remote site in real time.

The D+V modem at the remote site can be configured to ignore any unrecoverable packets which contain voice data and replace the voice data with voice data which would translate to silence or average the erred gap. This way, a listener is not subjected to noises and pops which might occur if errors in the voice frames were present in the voice signal presented to the listener.

Remote video game data is real-time data which presents particular problems. In a typical video game application, a player interacts with his or her own game system, such as the game systems made by Sega, Nintendo, Atari, etc., or such as a computer game running on a personal computer. In an interactive video game, more than one player is involved. Typically, each player interacts with their own game system as in the non-interactive game, but other players can take actions which affect that player's game. Thus, an interactive video game accepts local input as well as remote input. If the players are geographically separated and no other communication link is provided, then the game systems are coupled by a telephone line. For more than two players, a conference call arrangement can be used.

Where a player wants to be in voice contact with the other players and only has one telephone line available, the present invention is used to provide the voice connection while transferring remote video game data between game systems. Remote video game data is extremely time sensitive, but is relative low bandwidth.

For example, suppose each player manipulates a joystick to cause a player's character in a video game to move, and the game is interactive because each player sees each player's character and its movements. This is made possible by the transfer of remote video game data between game systems, the remote video game data representing the joystick movements of each player. If the remote joystick movement information is delayed too much, some players will be seeing out-of-date views of the video game.

For this reason, remote video game data is extremely time-sensitive, and once presented to a local modem such as modem 24 shown in FIG. 2, it must be quickly transported to the remote modem and to the remote game system. Fortunately, the bandwidth required for this data is very low, and this low bandwidth requirement can be used to great advantage. For example, if 5 bytes of data each refresh cycle of the video game display is sufficient to communicate the remote joystick movements, a bandwidth of only 300 bytes/sec is needed if the refresh cycle is 60 Hz.

Figure 6:
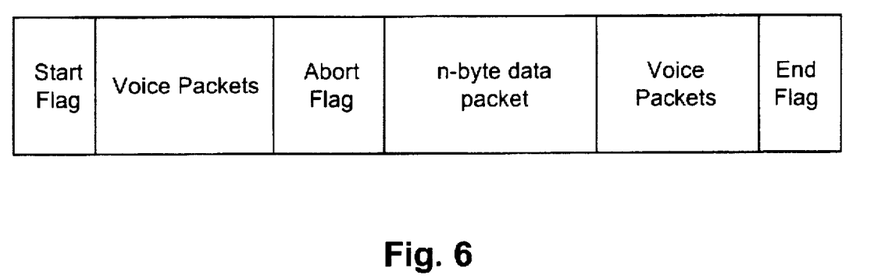
FIG. 6 is a schematic diagram of a modified HDLC frame used to transmit video game control data or other low delay-tolerant data and voice data at the same time.
Figure 7:
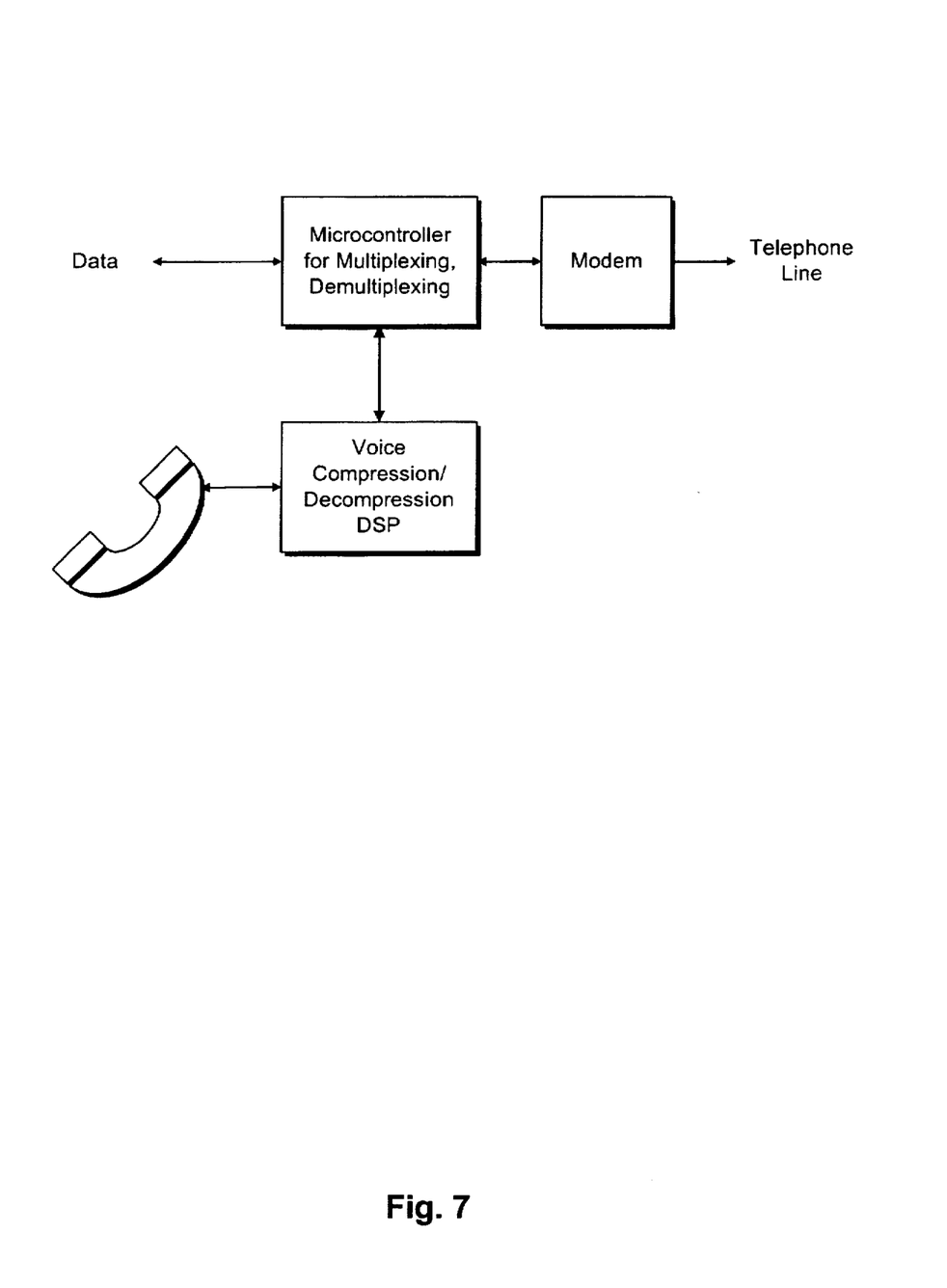
FIG. 7 is a diagram of a known circuit used for multiplexing sources of data onto a telephone line.

FIG. 6 is a schematic diagram of a modified HDLC frame used to transmit video game control data or other low delay data. The video game control data packets are of a preagreed size, such as N bytes, where each modem agrees on the value of N, so that no bandwidth need be used to signal the end of a video game control data packet. If regular HDLC frames were used, either the remote video game data would need to be accumulated into a frame, which causes an unacceptable delay, or each N-byte packet would be transmitted as a separate packet, which would also cause a delay, since the transmission of the data must wait at least until any packet transmission in progress when the video game data is presented to the modem has completed. The use of an entire frame for each N-byte packet is also very wasteful of bandwidth for low values of N, such as N=4 or N=5, since the other fields of the frame might be larger than the data field.

As shown in FIG. 6, the modified HDLC frame contains the same fields as an HDLC frame, except that the Address, Control, and FCS fields are optionally removed. The N-byte packet is simply placed between voice packets with an escape code. The escape code is known as an "Abort Flag", and is inserted in between the voice packet being transmitted by the local modem when the video game data is received by the local modem. That way, the remote video game data need not be delayed until the end of the frame. The Address and Control fields are not needed in this application, since all frames are addresses as voice packets. The FCS flag is eliminated, because otherwise the insertion of the N-byte data packet would cause a check sum error. The elimination of these various fields leads to more efficient use of bandwidth.

The insertion of the N-byte packet is detectable at the remote modem, since the Abort Flag is not a bit sequence which would occur within a voice packet. The end of the frame is still detectable because the End Flag is also not a bit sequence which would occur in a voice packet. If the value of N is fixed ahead of time, then the bytes in the N-byte packet can take on any possible bit sequence without ambiguity.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A modem for transferring data and voice signals over a telephone line, comprising:

a data input for accepting data as a data stream, said data stream being a sequence of symbols ordered in time according to when said symbols are received at said data input;

a voice input for accepting a voice signal representing a voice, said voice signal being received over a period of time;

a voice signal digitizer, coupled to said voice input, for converting said voice signal into a digitized voice data stream;

framing means, coupled to said voice signal digitizer and said data input, for generating HDLC frames from said digitized voice data stream and said data stream from said data input, wherein an HDLC frame includes an address indicating a data source, said data source being either said digitized voice data stream or said data stream, and wherein a ratio of data frames to voice frames is variable and dependent on the amounts and type of information to be sent; and transmission means, coupled to said framing means and the telephone line, for transmitting said HDLC frames over the telephone line.

2. The modem of claim 1, wherein said framing means provides HDLC frames to said transmission means in a priority order, said priority order such that voice frames are sent before data frames when both voice frames and data frames are pending transmission.

3. The modem of claim 1, wherein said data stream is a collection of a plurality of substreams.

4. The modem of claim 3, wherein said address also indicates one of said plurality of substreams as a source of data.

5. The modem of claim 1, wherein said framing means accepts data streams from a plurality of non-real-time data sources and a plurality of real-time data sources.

6. The modem of claim 5, wherein said non-real-time data sources include a computer communications subsystem for sending facsimile data, file transfers and images, and said real-time data sources include digitized voice signals, digitized video and audio signals, musical instrument digital interfaces and video game data.

7. A modem for transferring data and voice signals over a telephone line, comprising:

a data input for accepting data as a data stream, said data stream being a sequence of symbols ordered in time according to when said symbols are received at said data input;

a voice input for accepting a voice signal representing a voice, said voice signal being received over a period of time;

a voice signal digitizer, coupled to said voice input, for converting said voice signal into a digitized voice data stream;

a data framer, coupled to said voice signal digitizer and said data input, which generates modified HDLC frames from said digitized voice data stream and said data stream from said data input, wherein a modified HDLC frame includes an address indicating a data source, said data source being either said digitized voice data stream or said data stream and the modified HDLC frame includes delimiters to delimit data stream bits within a modified HDLC frame containing digitized voice data stream bits; and a telephone line coupler, coupled between said data framer and the telephone line, which converts said frames into signals suitable for transmission over the telephone line.

* * * * *